Patented July 23, 1940

2,208,967

UNITED STATES PATENT OFFICE 2,208,967

TOOTH FILLING MATERIAL

Egon Elöd, Karlsruhe, Germany, assignor to Chemical Marketing Company Inc., New York, N. Y.

No Drawing. Application November 3, 1936, Serial No. 108,965. In Germany November 5, 1935

13 Claims. (Cl. 106—6)

As is known a tooth filling material which serves all practical requirements and which is widely satisfactory is still missing. The use of good filling materials, such as gold and porcelain is much too troublesome and too expensive in general practice. The silicate fillings do not sufficiently resist the chemical requirements in the mouth. The mercury-containing fillings which are used to a marked extent are rather delicate because of any injurious effects to health that might occur. Some newly recommended mercury-free alloys solidify at such high temperatures and so rapidly that they are not suitable for practice.

In accordance with the present invention it has been established that artificial, organic, waterinsoluble products, particularly polymerisation products, such as polyvinylesters, polystyrenes or mixed polymerisates, mixtures of polymerisates respectively, for instance, of styrenes and vinylesters, particularly the polyvinylacetates known under the trade-name "Mowilith" which become more or less soft at temperatures of about 50° C. or become plastic, are an excellent material for tooth fillings and are far superior to all materials indicated above. They may be readily made into lozenges of a size which is suitable for dental practice. In the plastic state they stick tightly to the tooth substance and do not shrink on solidifying. They show a far reaching resistance to chemical and mechanical requirements in the mouth.

The tooth filling materials are generally transparent, like glass, and may be improved according to the practical requirements and adapted to the tooth substance by suitable additions, such as turbidity agents, for instance, titanium dioxide, coloring agents, such as iron oxide, hardening agents, for instance quartz flour, further by the addition of waxes, resins, softening agents or plastifying agents and the like. These agents (specified above) may, for instance, readily be introduced into the polyvinylesters by dissolving the polymerisates in suitable organic solvents, such as toluene, or may be introduced in the plastic, kneadable, swelling state in which the additional substances may be mixed with the polymerisates in mixing, stirring or kneading apparatus and the like. After homogenizing the solvents or swelling agents are caused to evaporate again.

Likewise polymerisates of various properties, for instance, of various hardness, plasticity, elasticity, color and the like may be brought into the teeth in several layers one placed upon the other, or a softer or more elastic layer may be placed between two harder layers. It is also possible to provide fillings of the said kind with other covers, for instance, gold plates; in such cases it would be best to provide the gold crowns or the like with pins and to introduce them after heating into the filling material which is still plastic.

Finally it may be mentioned that tooth fillings of the said kind are readily repairable.

I claim:

1. A tooth filling comprising an artificial, thermoplastic, organic, waterinsoluble resin capable of softening at temperatures of about 50° C.

2. A tooth filling comprising an artificial, thermoplastic, organic, waterinsoluble polymerisation product capable of softening at temperatures of about 50° C.

3. A tooth filling comprising an artificial, thermoplastic, organic, waterinsoluble polyvinylester capable of softening at temperatures of about 50° C.

4. A tooth filling comprising a waterinsoluble polyvinylacetate capable of softening at temperatures of about 50° C.

5. A tooth filling comprising a waterinsoluble polystyrene capable of softening at temperatures of about 50° C.

6. A tooth filling comprising a mixed waterinsoluble polymerisate capable of softening at temperatures of about 50° C.

7. A tooth filling comprising a mixed waterinsoluble polymerisate of vinyl compounds capable of softening at temperatures of about 50° C.

8. A tooth filling comprising a mixed waterinsoluble polymerisate of a styrene and a vinyl ester, capable of softening at temperatures of about 50° C.

9. A tooth filling comprising a waterinsoluble mixture of polymerisates, capable of softening at temperatures of about 50° C.

10. A tooth filling comprising a waterinsoluble mixture of polymerisates from a styrene and a vinyl ester, capable of softening at temperatures of about 50° C.

11. A tooth filling comprising an artificial, thermoplastic, organic, waterinsoluble resin capable of softening at temperatures of about 50° C. and an additional ingredient.

12. A tooth filling comprising an artificial, organic, waterinsoluble polyvinylacetate capable of softening at temperatures of about 50° C. and an additional agent.

13. A tooth filling comprising an artificial, thermoplastic, organic, waterinsoluble resin capable of softening at temperatures of about 50° C. and an additional ingredient intended to reduce the softening point of the artificial resin, which additional ingredient has been selected from the group consisting of softening and plastifying agents, waxes and natural resins.

EGON ELÖD.